United States Patent [19]
Poulsen

[11] 3,886,029
[45] May 27, 1975

[54] METHOD AND APPARATUS FOR THE CONTINUOUS PRODUCTION OF FIBER REINFORCED PLASTIC PIPES OF VARIABLE WALL THICKNESS

[75] Inventor: Peder Ulrik Poulsen, Esrum, Denmark

[73] Assignee: Owens-Corning Fiberglas Corporation, Toledo, Ohio

[22] Filed: Oct. 24, 1973

[21] Appl. No.: 409,193

Related U.S. Application Data

[62] Division of Ser. No. 217,115, Jan. 12, 1972, Pat. No. 3,788,918.

[52] U.S. Cl. .............. 156/429; 138/144; 156/171; 156/188; 242/7.23
[51] Int. Cl. ...................... B65h 81/00; B31c 13/00
[58] Field of Search .......... 156/429, 449, 431, 450, 156/432, 453, 447, 458, 448, 392, 425, 427, 426, 428, 169, 188, 173, 195, 174, 443, 175, 446, 187, 549, 524, 551; 226/123; 57/11; 138/144; 93/80, 94; 242/7.21, 7.23, 7.22

[56] References Cited
UNITED STATES PATENTS

| | | | |
|---|---|---|---|
| 2,747,649 | 5/1956 | Reed | 138/144 |
| 2,995,175 | 8/1961 | Lundskow | 156/429 |
| 3,535,865 | 10/1970 | Botz | 57/11 |
| 3,554,839 | 1/1971 | Medney | 156/425 |
| 3,614,005 | 10/1971 | Chartier | 242/7.22 |
| 3,737,353 | 6/1973 | Gilbu | 156/195 |
| 3,784,429 | 1/1974 | Muller | 156/429 |

*Primary Examiner*—Charles E. Van Horn
*Assistant Examiner*—J. Gallagher
*Attorney, Agent, or Firm*—Carl G. Staelin; John W. Overman; William P. Hickey

[57] ABSTRACT

Method and apparatus for producing a shell of nonuniform thickness wherein hardenable shell forming materials are fed onto an envelope which is both rotated about a longitudinal axis and simultaneously advanced along the axis at a generally constant rate. The materials are fed onto the envelope from applicator means at a generally uniform and preferably uninterrupted rate. Nonuniform shell thickness is obtained, however, by moving the applicator means in one of the directions of envelope movement for a portion of a programmed cycle to give a thick shell section and returning the applicator means in the opposite direction of envelope movement to the starting point of the applicator means during another portion of the cycle to give a thinner shell section. The movement of the applicator means may be longitudinally of the envelope, or may be circumferentially of the envelope.

10 Claims, 7 Drawing Figures

3,886,029

METHOD AND APPARATUS FOR THE CONTINUOUS PRODUCTION OF FIBER REINFORCED PLASTIC PIPES OF VARIABLE WALL THICKNESS

This is a division of application Ser. No. 217,115, filed Jan. 12, 1972, now U.S. Pat. No. 3,788,918.

BACKGROUND OF THE INVENTION

The present invention relates to the manufacture of tubular products of nonuniform wall thickness, and more particularly to pipe or shells of fiber reinforced plastic materials. An example of such a product is a large diameter shell which is to be disposed vertically and used as a storage tank and the wall thickness of which is reduced in steps proceeding from bottom to top in a manner compensating for the decrease in load. Further examples are culverts or storage tanks which are buried underground, and the internal bursting pressure of which is low while the major strength consideration is the resistance to earth pressure. In order to obtain maximum strength with the use of minimum materials, annular stiffening ribs or belts of increased wall thickness are frequently provided on the underground tanks at right angles to the axis of revolution.

The most frequently used method of producing plastic shells having wound reinforcement therein is a discontinuous process wherein a slide or carriage which supports the spools of continuous filaments is caused to reciprocate axially of a rotating mandrel until a desired thickness of filament winding is produced. The laminate is impregnated with resin either simultaneously with the winding or on the completion of the winding, and when the resin has been cured, the mandrel is withdrawn. Thereafter the mandrel is remounted and made ready for the winding of another shell. In this process, the mandrel is normally supported at both ends.

Recently methods have been devised which differ from the discontinuous method described above in that the filament winding is carried out continuously in a continuous process. In this recent process, the winding mandrel is supported at one end only, and the surface of the mandrel moves past the reinforcement feeding apparatus at a constant rate that is dependent upon the speed of rotation of the mandrel. A heating chamber is provided adjacent the free end of the mandrel for curing the resin applied to the wound reinforcement to produce a rigid and fully cured shell which advances off of the free end of the mandrel. The present invention is intended for use in this type of apparatus wherein the axial displacement of the shell per revolution of the mandrel is constant as determined by the construction of the apparatus, and in which a variation of this axial displacement is not feasible.

In contrast to the discontinuous process above described, the reinforcing materials used in the continuous process are generally fed from one or more stations which are stationary relative to the mandrel, and which utilize the longitudinal displacement of the mandrel surface or envelope to spirally wind the complete thickness of reinforcement in one pass. In the continuous process there is no reciprocating movement of the carriage and therefore no cross winding of the filaments. The continuous process produces a spiral winding pattern having a relatively low pitch; and if the reinforcement is provided exclusively by continuous filaments, as for example glass fiber rovings, a special reinforcement must be introduced into the continuous process for obtaining the necessary strength in the longitudinal direction of the shell produced. In one commonly used continuous process, the special reinforcement used is a glass fiber matting, the fibers of which are randomly oriented and bonded together by a binder resin to produce a resin bonded laminate having substantially the same strength in all directions. The matting is supplied in the form of long strips having a width which is a multiple of the longitudinal displacement per revolution of the mandrel. If for example a matting strip having a width of 40 centimeters is used, and the mandrel displacement per revolution is 8 centimeters, a spirally wound 5 ply laminate is produced. Each revolution of the 40 centimeter wide strip results in 32 centimeters of the strip being overlapped, so that after 5 revolutions a 5 ply laminate is produced. Where such a matting is the only reinforcement material used, the strength of the resulting shell will be substantially the same in both the longitudinal and the circumferential direction of the shell. Often hovever a shell having a greater strength in the circumferential direction is required, and in this case the matting is combined with filament rovings, which as indicated above, are wound at the pitch determined by the longitudinal displacement of the mandrel. By introducing spirally wound filament rovings, it is possible to obtain a longitudinal to circumferential strength ratio of 1:2, 1:3 or 1:4. In the prior art continuous process, the rovings are sometimes distributed uniformly over the region in which the matting is applied, so that the rovings are distributed uniformly throughout the entire thickness of the shell. In other instances, the prior art has attempted to introduce the rovings in the form of a narrow strip grouped in the center of the strip of matting, and in this case, the rovings are concentrated in a layer in the center of the shell thickness with layers of matting below and above the layers of wound roving. Chopped glass fibers can be used in lieu of the matting strips by chopping the rovings into short fibers and projecting the fibers and resin onto the mandrel with pressurized air. The width of the layer of chopped fibers can be varied as described above for the matting to produce the desired spiral lap or build-up, and the resulting product will be substantially identical. The fibers can be allowed to fall freely onto the surface of the mandrel, or can be incorporated with the continuous filament rovings to in this manner carry the chopped fibers to the mandrel. In this case the continuous rovings hold the chopped fibers down onto the surface of the mandrel as it revolves. In some cases the chopped fibers are not randomly oriented but are oriented generally parallelly to the axis of the mandrel to increase the longitudinal to circumferential strength ratio of the product produced. All of the variations above described can be used in the continuous process of the present invention later to be described in detail.

As previously mentioned, it is possible to use a graduated wall thickness of shell, in which the thickness decreases with height, for those shells which are to be used for vertical tanks or air shafts, because the load on such shells decreases with height. A need for nonuniform wall thickness also exists for underground storage tanks or culverts which are to be buried underground. In these instances the internal bursting pressure is low and the resistance to earth pressure is the controlling design consideration. To increase the resistance to external loads, stiffening ribs or belts of increased wall thickness are frequently used, and these ribs or belts may be solid or hollow bands or rings. One method, not in accordance with the present invention, of producing the stiffening ribs is to feed preshaped reinforcement materials in a narrow ribbon to the rotating mandrel from a stationary winding station. This results in a helical rib of a low pitch per revolution which is equal to the longitudinal displacement of the mandrel per mandrel revolution.

In those instances where a greater distance between ribs is desired, it has been proposed to supply the material for the winding of the ribs from a station which winds the rib only and which is moved along at the same axial displacement as is the mandrel. This special winding station is independent and in addition to the stationary feeding station which produces the bulk of the shell. The special rib winding station is mounted on a carriage or slide which is moved longitudinally of the mandrel and is coupled to the driving mechanism of the mandrel in such manner that it moves along with the mandrel while the rib is being wound, and then rapidly returns to the starting point in time to commence the following rib. In this process of independently winding a rib over the top of the shell produced by the primary shell winding station, the rapid return of the special winding station to its starting point produces a high pitch helical band of the rib forming materials on the surface of the shell between ribs. This high pitch helical band of winding material must be later removed where sleeves or container bottoms are to be fitted over the shell; and in addition, constitutes a waste of the reinforcement materials because these high pitch helical bands do not contribute to the rigidity of the shell produced. Because of these deficiencies, the commercial prior art continuous shell forming processes add the stiffening ribs to the shell as a separate operation which is done after the shell is removed from the mandrel. In addition the prior art has only been able to vary the thickness of pipe or shell produced by manually varying the number of strands or the amount of chopped fibers or mat that is fed to the mandrel. The stopping and starting of strands or matting is not suited to automation. The prior art, therefore, has regarded the continuous process as being capable of producing a uniform cylindrical shell only.

An object of the present invention is the provision of a method whereby a continuous shell producing process can be utilized to produce a shell of graduated wall thicknesses and/or the winding of stiffening ribs that are perpendicular to the longitudinal axis of the shell, while avoiding the above mentioned difficulties.

A further object is the provision of a method which is suited for automation and which can be incorporated into existing continuous process machinery that is now capable of producing a uniform thickness of shells only.

DESCRIPTION OF THE PREFERRED EMBODIMENTS

According to the present invention, the above stated objects are achieved by feeding the major part of the reinforcing materials (that is all but the inner and outer surface layers) from a single station that is moved from a starting position for a predetermined distance, and is then moved back to the starting position in a programmed cycle while the mandrel is advancing. When the mandrel is both rotated and moved longitudinally, and the station is moved longitudinally, bands of different thickness are produced. When the mandrel is both rotated and moved longitudinally and the station is moved radially, longitudinal bands of different shell thickness are produced.

According to one embodiment of the invention, a longitudinal variation in the shell thickness is provided by mounting the shell winding station i.e. the station which feeds the major portion of the reinforcement material for the shell, on a carriage or slide which is moved longitudinally of the axis of rotation of the mandrel. The carriage is moved at various programmed rates with each programmed rate being in timed relation to the rotation of the mandrel. The axial movement of the main shell winding station therefore results in a pitch of wound materials which is different than the pitch of the surface of the mandrel; and which is lower than the pitch of the surface of the mandrel when the main winding station moves in the same direction as the mandrel surface, and higher than the pitch of the mandrel surface when the main station moves in the opposite direction.

Figure 1:
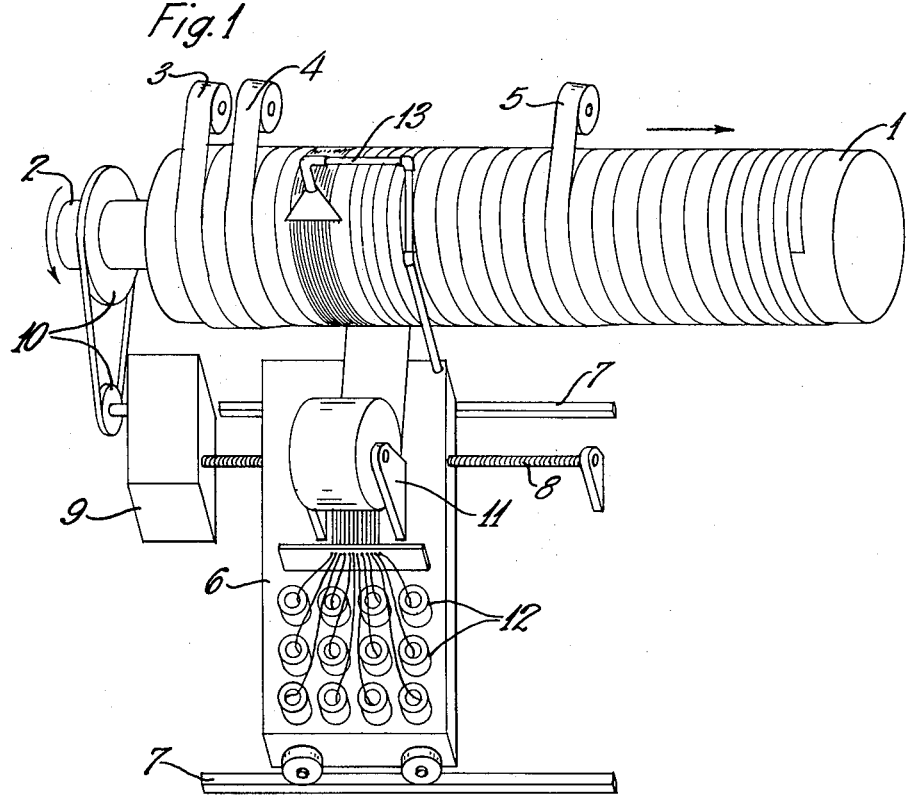
FIG. 1 is a schematic oblique view of one embodiment of apparatus for carrying out the method of the present invention.

In the embodiment shown in FIG. 1, a width of reinforcement materials is used that is substantially greater than is the displacement per revolution of the mandrel surface, or envelope, on which the materials are wound. This results in a laminated shell comprising a plurality of overlapping layers of reinforcement materials, which preferably are a combination of short randomly oriented lengths of glass fibers supplemented with continuous rovings, and which materials are wound in low-pitch helical angle.

The mandrel 1, is mounted on a journal 2, which is supported on bearings not shown, and is caused to be rotated by a motor (not shown) in the direction indicated by the arrow. The mandrel has an exterior surface, or envelope, thereon that is adapted to be moved longitudinally of the axis during this rotation in a manner taught by the prior art to continuously feed the product wound on the mandrel towards its free end. At the free end, the product is cut into desired lengths by a cutting unit, not shown, which works in synchronism with the axial movement of the envelope. The reinforcement materials may be fed from either side or both sides of the mandrel. In the arrangement illustrated, a cellophane tape 3 used to prevent contact between subsequently applied resin and the surface of the mandrel is fed from one side of the mandrel. The cellophane tape is later removed from the inside of the finished product. A layer 4 of a surface reinforcing matting is next fed to the mandrel, and the purpose of this surface matting is to provide omnidirectional reinforcement for a highly resinuous, chemically resistant inner surface layer. A similar layer of matting 5 is applied subsequent to the main body of reinforcing material to reinforce an outer surface layer. The cellophane and surface reinforcing materials 3, 4, and 5 are therefore always wound at the constant pitch as determined by the movement of the envelope of the mandrel.

A carriage which rolls along two rails 7 is positioned on the opposite side of the mandrel from stations 3, 4, and 5. The carriage is moved in the longitudinal direction of the mandrel by means of a lead screw 8 that is driven by a gear box 9, and the input shaft of which is driven from the mandrel shaft by the chain sprocket 10. The gear box 9 contains various transmission elements, including a programable forward, reverse and release mechanism by means of which the operator may cause the carriage to reciprocate at any arbitrary rate along the rail 7 or to stop when this is desired. The carriage is provided with a roll support 11 for the matting material, and a plurality of roving packages 12 from which glass fiber matting and roving elements are fed to the underside of the rotation mandrel. The carriage is further provided with a piping system 13 from which resin is metered to the upper surface of the mandrel in proportion to the amount of reinforcement material being fed to the mandrel. It will be apparent that still other combinations of reinforcement materials can be used in lieu of the matting and roving, and that these materials can be applied by the carriage 6.

The operation will now be described as being used to produce the shell of the vertical storage tank illustrated in FIG. 2. The reinforcement material used in a glass fiber chopped strand matting having a weight of 1450 grams per square meter and a width of 40 centimeters. This matting is supplemented by a plurality of continuous strand rovings in an amount to obtain a longitudinal to circumferential strength ratio of approximately 1:3. The longitudinal displacement of the mandrel surface per revolution is 80 mm and when the carriage 6 is kept stationary, a spirally wound laminate containing 5 layers of matting and 5 layers of roving is produced. The thickness of the finished shell is approximately 6 mm.

Figure 2:
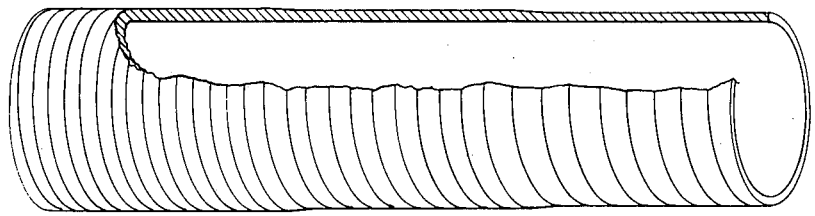
FIG. 2 is a shell of graduated wall thickness having a section removed and which can be produced by the apparatus and method depicted in FIG. 1.

The shell shown in FIG. 2 has a total length of 8 meters, the first third of which has a shell thickness of 9 mm the center third of which has a thickness of 6 mm, and the last third of which has a thickness of 4 mm. The 9 mm thick section is produced by winding the 40 centimeter wide band of reinforcement materials at a pitch of 53 mm per revolution to give an average thickness of approximately 7.5 layers. The length of the 9 mm. thick section is 2.66 meters, so that when it is wound at a 53 mm pitch, a total of 50 revolutions of the mandrel is required. During 50 revolutions of the mandrel its surface moves 80 mm per revolution for a total displacement of 4 meters. During the initial 50 revolutions of the mandrel, therefore, the carriage travels 4 minus 2.6 or 1.34 meters towards the right as seen in FIG. 1, and the gearbox 9 is adjusted or programmed to give this ratio. The next 2.6 meters of pipe is obtained using a winding pitch of 80 mm per revolution, and this is accomplished by keeping the carriage stationary during the next 33 revolutions. The last third of the shell is wound at a pitch of 120 mm per revolution to produce a section that is 2.66 meters long and requires 22 revolutions of the mandrel. During the 22 revolutions of the mandrel, the mandrel surface will move 1.76 meters, so that the carriage travels 0.9 meters to the left. Since the carriage traveled 1.34 meters toward the right during the formation of the first third of the shell, a slight movement of 0.44 meters toward the left is required to return the carriage to its starting position. This 0.44 meters can be used to provide an additional length of one of the sections, or another fragmentary shell, or a pitch smaller than 120 mm can be used to produce the third section. This smaller pitch will produce a slightly thicker wall thickness for the third section but will allow the process to proceed continuously without interuption between 8 meter long shell sections. If the latter is done, manual operation of the gear box 9 can be replaced by an automatic programming of the gear box.

Figure 3:
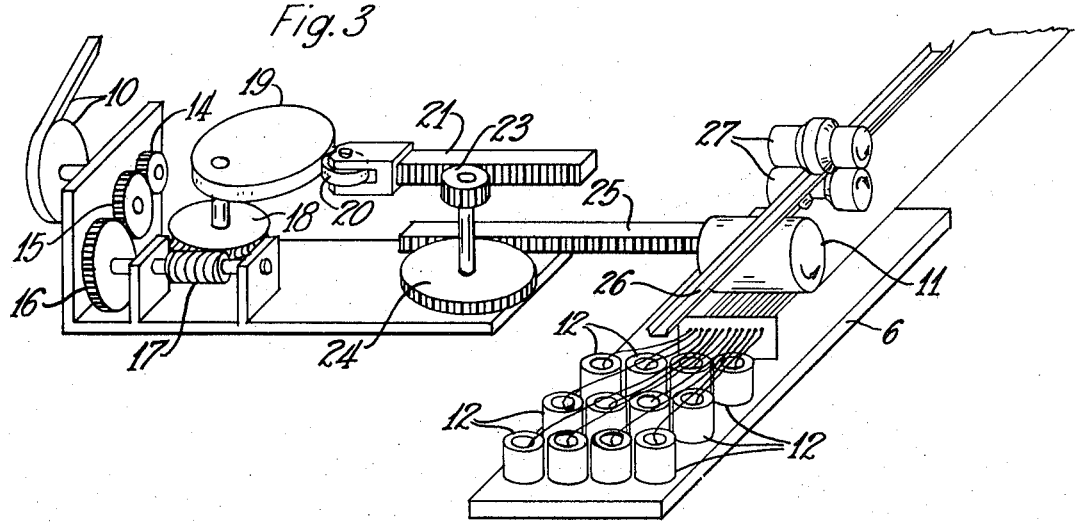
FIG. 3 is a fragmentary oblique view of another embodiment showing the drive mechanism for the carriage in an enlarged somewhat schematic manner.

FIG. 3, of the drawing shows a completely automatic machine wherein the gear box has been replaced by a cam which mechanically controls the cyclic movements of the carriage 6. Those portions of the embodiments shown in FIG. 3 which are the same as those shown in FIG. 1, are designated by a like reference numeral. The chain 10, which is connected to the shaft of the mandrel, drives a gear 14 which in turn drives the intermediate gear 15, that in turn drives the gear 16 whose shaft rotates the worm 17. The worm 17 in turn drives a gear 18 on whose shaft a cam 19 is mounted which abuts a cam follower 20 that is fixed to a rack 21. The rack 21 engages a gear 23 which in turn drives a larger gear 24 which is in engagement with a driven rack 25 that is fixed to the carriage 6. As previously indicated, the gear 14 is driven by the mandrel shaft through the chain and sprocket 10, and the gears 14 and 16 are adapted to be quickly removed from their shafts, and gears of different sizes substituted therefore. The intermediate gear 15 is mounted on a shaft whose position can be adjusted, so that it will accommodate gears 14 and 16 of different sizes. By this arrangement the number of mandrel revolutions required to produce one revolution of the cam 19 can be adjusted to produce shells of different lengths. In most instances it will be sufficient for the carriage to travel a maximum of 1.5 meters. The gears 23 and 24 provide magnification of movement to convert the relatively short displacement provided by the cam follower 20 into the large movement that is required of the carriage.

With the embodiment shown in FIG. 3, it will be advantageous to provide a cam and its drive and driven gears which provide the necessary carriage movement to complete a full cycle. With a suitably constructed cam, it is possible to obtain a continuous variation in wall thickness throughout the length of shell produced. A parabolic cam for example will produce a linear variation in speed of the carriage which in turn produces a straight line variation in wall thickness over the length of the shell produced. By way of example, it is possible to produce a straight line decrease in wall thickness from 8 mm to 4 mm over a production shell length of 8 meters by suitably reciprocating the carriage over a distance of 0.85 meters. By suitably changing the shape of the cam, it is further possible to produce locally increased thicknesses of shell which otherwise has a straight line variation throughout its length. These locally thickened areas, for instance, can be used to provide recesses or form external stiffening ribs.

Figure 4:
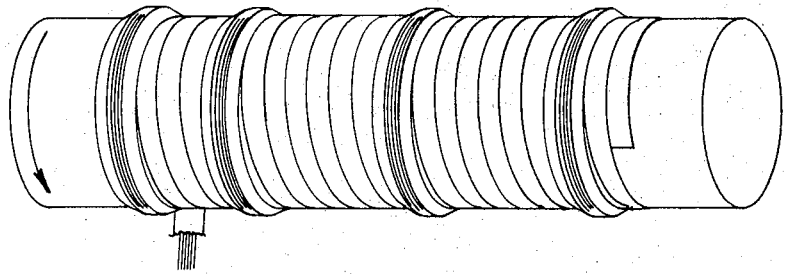
FIG. 4 is an oblique view of a mandrel with a shell thereon being produced by the apparatus shown in FIG. 3.

By way of example, the apparatus shown in FIG. 3 can be used to produce the shell shown in FIG. 4, which has locally spaced apart thickened areas. A reinforcement material comprising glass fiber matting having a width of 40 centimeters and a band of roving confined to the center 12.8 centimeters of the matting is utilized. The cam 19 is formed to move the carriage at a constant rate to the right for 3 revolutions of the mandrel and then return to the starting point at a constant rate during the next 5 revolutions. The cam thus rotates once for each 8 revolutions of the mandrel. The mandrel surface is displaced 8 cm per revolution so that a rib is produced every 64 cm. The carriage travels 24 cm. forward, and 24 cm backward and the pitch in the region between the ribs is therefore 8 + 24/5 = 12.8 cm. When using 40 cm wide strips of mat, a total of 3 layers of mat is produced between the ribs with an additional overlap of 1.6 cm., and 6 layers of mat are deposited in the areas of the ribs. If the 12.8 cm wide roving band is confined to the center of the strip of matting, the surface of the shell that is produced between the ribs is reinforced by matting only, and the rovings are positioned centrally between inner and outer layers of the spirally wound matting. The ribs shown in the drawing can be massive, but it is further possible to introduce a form such as a cardboard core, an extruded plastic form, or a foamed plastic form 26 having a length equal to the circumference of the shell during the winding of the ribs. By way of example, feed rolls 27 driven by a motor, not shown, can be started after the first layer of reinforcement material is applied to the region of the ribs to move the form 26 under the second and third layers of the reinforcement as they are applied to the mandrel. This increases the diameter of the center portion of the second and third layers of reinforcement material to increase the section modulus of rib that is produced.

As previously mentioned, glass fibers can be substituted for some or all of the materials of the mat 11. This may be done using conventional "Spray-up" technique wherein chopped fibers are thrown into an air stream carrying droplets of resin and catalyst to cause the fibers to become wetted with resin and deposited on the surface of the mandrel. The chopped fibers may be allowed to fall onto the top surface of the mandrel and the resin applied thereto or the chopped fibers may be deposited onto a continuous strand or mat that is fed to the mandrel. The apparatus which chops the fibers and sprays the resin is sometimes called a "chopper". The stream of dispersed fibers and resin can be constant in output and cyclically varied in position during each rotation of the mandrel to produce pipe having longitudinal ribs. Oscillation of the stream can also be varied according to whole numbers of revolutions to produce thin and thick sections of pipe. In this manner the input of raw material per unit of mandrel surface will be varied to produce the thick and thin sections forming the longitudinal ribs. The cycle can also be varied according to both a fraction of a revolution and whole numbers of revolutions to produce a network of longitudinal and circumferential ribs.

Figure 5:
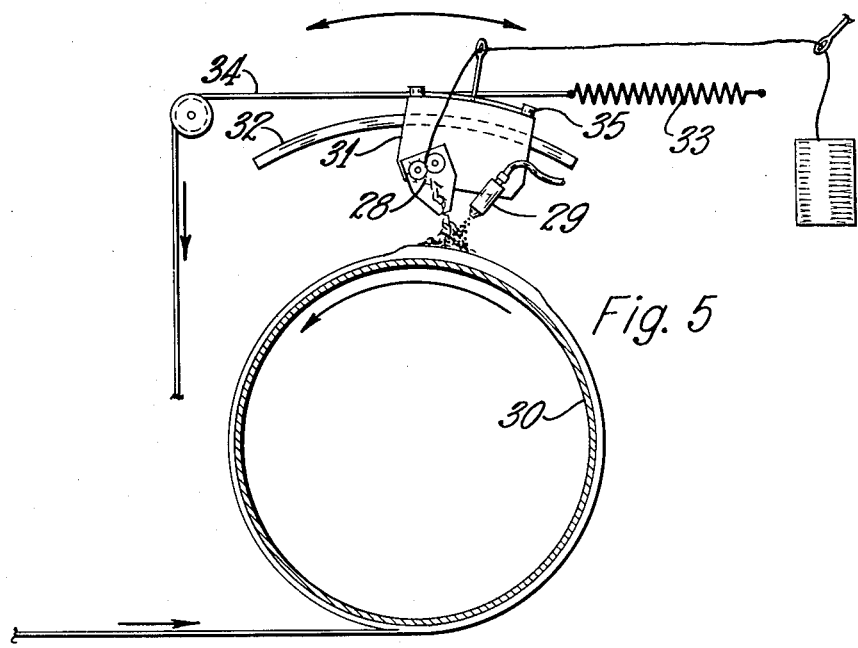
FIG. 5 is a somewhat schematic view of another embodiment of the invention for forming pipes with longitudinal ribs.

In the embodiment shown in FIG. 5, a chopper 28 and the associated resin nozzle 29 of the Spray-up device discharges downwardly onto a mandrel 30. The speed of rotation of the chopper and the speed of the resin pump which supplies resin to the nozzle 29 are synchronized with mandrel rotation so that discharge thereof is proportional to the lateral speed of the mandrel. The chopper and resin nozzle which comprise a conventional Spray-up device is mounted on a slide 31 which moves along an angular rail 32 which is concentric with the surface of the mandrel. The slide 31 is biased in a direction opposite to that of mandrel rotation by a coil spring 33 and is pulled along the rail 32 by a chain 34 that is affixed to the slide by suitable bolts 35. The other end of the chain is connected to a cam mechanism, not shown, but which is of the same general type as that shown in FIG. 3. The cam to which the chain is connected is driven at the same angular speed as is the mandrel 30. By this arrangement, the slide 31 is caused to travel back and forth on the rail 32 according to a cycle of movement which is determined by the shape of the cam.

The device shown in FIG. 5 will now be described as it is used to produce a pipe having a longitudinally extending rib covering 30° of its circumference. The wall thickness of the rib is approximately twice that of the remaining wall thickness. The cam, not shown, moves the slide along the track in the direction of the mandrel rotation, as shown by the arrow in FIG. 5, at a rate which is one-half that of the surface of the mandrel. The total movement of the slide is 30° and during this movement the mandrel rotates 60°. Thereafter the cam allows the slide to be pulled in the reverse direction by the coil spring 33 at a slow constant speed so that it reaches its starting point at the same time that the mandrel has revolved 360°. It will be seen that the amount deposited in the area of the rib will be twice that which would be deposited if the slide were held stationary, and that the remaining 330° of the pipe will have a thickness which is 330/360 of the amount which would be deposited if the slide were held stationary. The reinforced area of the pipe therefore will have a wall thickness which is 720/330 of the remaining unreinforced wall thickness of the pipe. The ratio of the thickness of the rib to the unreinforced area of the pipe can be varied over wide limits by appropriately changing the design of the cam.

It will now be apparent that the cam which produces the movement of the slide can be shaped for the formation of more than one longitudinal rib on each pipe and that the individual ribs can be made with different widths and thicknesses. It will further be seen that the chopped fibers and resin need not be deposited directly onto the mandrel but instead can be deposited on a band of reinforcing fibers that are carried to and wound onto the mandrel. In this case the upper spray nozzle is arranged to move laterally over the band of reinforcing fibers in a cycle that is repeated during each revolution of the mandrel.

Figure 6:
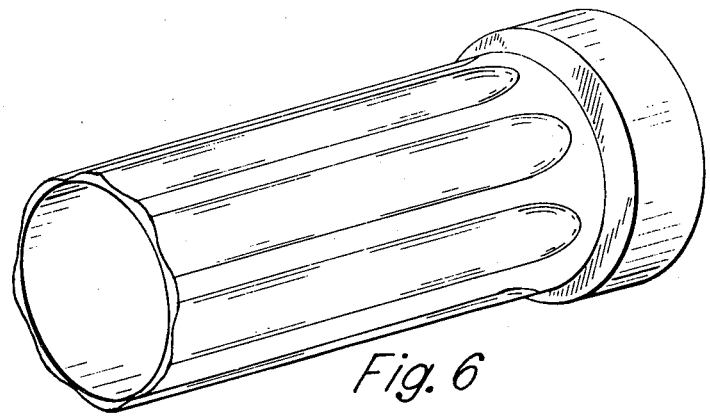
FIG. 6 is a pipe produced by the equipment shown in FIG. 5.

FIG. 6 is a pipe having 8 longitudinal ribs, and can be made with the device shown in FIG. 5 using a cam suitably formed and driven with respect to the mandrel. The cam is driven through a clutch which is disengaged at each end of the pipe where a pipe socket and a pipe spigot of uniform thickness are respectively produced. The shape of the mandrel and the amount of chopped fibers and resin used is regulated to provide clearance between the socket and spigot to receive the usual rubber O-ring seal.

Figure 7:
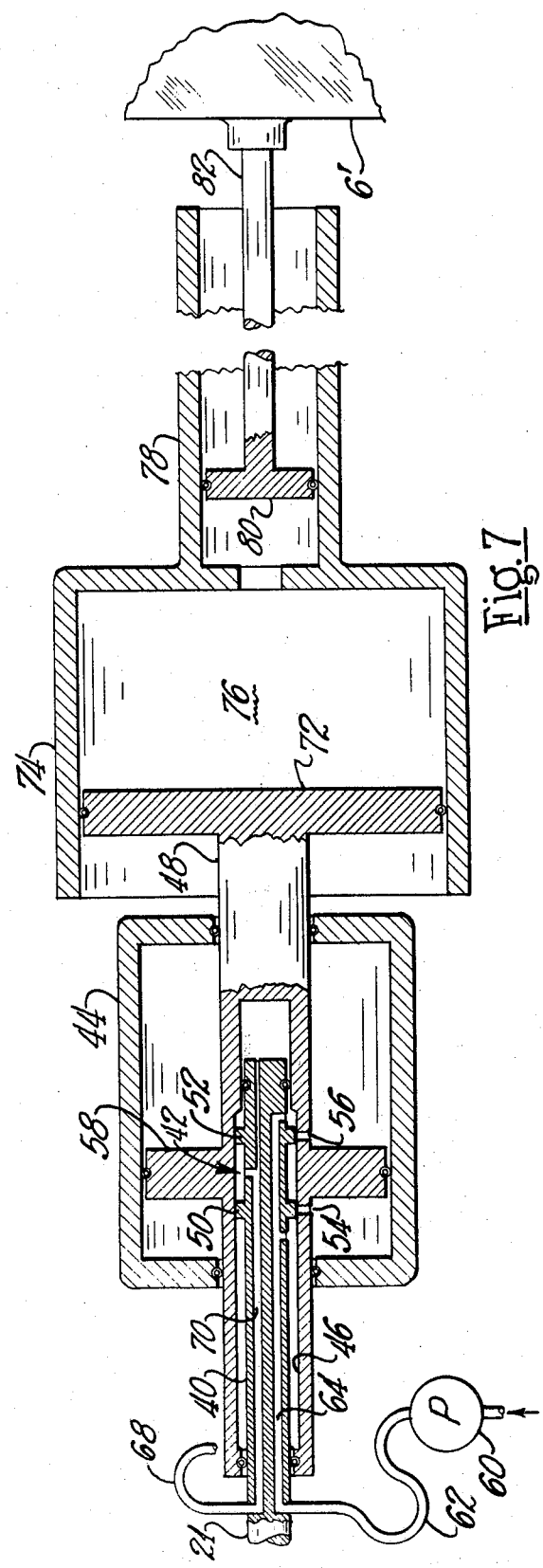
FIG. 7 is a schematic view of still another embodiment of the invention.

The embodiment shown in FIG. 7 is generally similar to the embodiment shown in FIG. 3, but differs principally therefrom in that the mechanism for translating the motion of the cam follower into movement of the carriage is hydraulically actuated. Those portions of the embodiment shown in FIG. 7 which correspond to portions shown in FIG. 3 are designated by a like reference numeral characterized further in that a prime mark is affixed thereto.

In the embodiment shown in FIG. 7, the cam follower 21 is affixed to the actuating rod 40 of the control valve 42 of the hydraulic servomotor 44. The control valve 42 is located within an axially extending bore 46 of the piston rod 48 of the servomotor. The actuating rod 40 has lands 50 and 52 which overlie the chamber ports 54 and 56 that communicate with the respective pressure chambers on opposite sides of the piston 58. A pump 60 supplies hydraulic pressure to a flexible line 62 communicating with a longitudinal passageway 64 in the rod 40. The passageway 64 communicates with the bore 46 outwardly of the land 50 and inwardly of the land 52. The bore 46 is stepped and the inner end of the actuating rod 40 projects into the inner reduced diameter portion of the bore 46. A flexible exhaust line 68 communicates with another passageway 70 in the actuating rod 40 which in turn communicates with the portion of the bore 46 between the lands 50 and 52.

It will now be seen that when the cam follower 21 moves the actuating rod 40 inwardly of the bore 46, pressure is communicated through chamber port 54 to the outer side of the piston 58 while exhaust is communicated to the inner side of the piston 58 to make the piston move inwardly to follow the actuating rod 40. When the actuating rod 40 stops, the piston rod 48 continues to move a slight amount to center the control valve 42 and bring the land 50 again over the port 54. Movement thereafter ceases. When the cam follower 21 is moved outwardly, the land 52 is moved outwardly of the port 56 to communicate pressure to the chamber on the inner side of the piston 58 while exhaust is communicated through port 54 to the outer side of the piston 58. This moves the piston 58 outwardly until ports 54 and 56 are again covered by the lands 50 and 52. It will now be seen that the piston 58 will follow the movement of the cam follower 21 in either direction.

The movement of the piston rod 48 is delivered to the piston 72 of a large diameter hydraulic cylinder 74 to pressurize the fluid in its inner chamber 76. Fluid from the chamber 76 is delivered to a smaller diameter hydraulic cylinder 78 to cause its piston 80 to move by a distance that is inversely proportional to the square of the diameters of the pistons 72 and 80. Piston rod 82 transfers this motion to the carriage 6'. A magnification of cam follower movement is thus obtained to move the carriage by a greater but always proportional distance. A spring or other device, not shown, can be used to bias the carriage 6' in the opposite direction to cause the hydraulic fluids to flow in the reverse direction when the cam follower 21 is retracted. It will now be seen that this embodiment has the advantage of being able to effect movement of the carriage 6' with great force, while exerting only a slight reaction on the cam 19.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. In apparatus for the formation of shells of the type having a mandrel which both rotates and is moved axially at a uniform rate to provide two degrees of mandrel movement that are generally at right angles to each other, the improvement comprising: guide means positioned to one side of the mandrel for continuously feeding the materials which produce the shell onto the mandrel in a band having a width greater than said axial rate of mandrel movement; drive means for moving said guide means back and forth generally parallel to one of said degrees of mandrel movement and which synchronizes guide means movement with mandrel movement; and cyclic programming means causing said drive means to move said guide means in one of said degrees of movement at a rate no greater than that of said mandrel to produce one thickness of shell and then move said guide means in the opposite direction to produce a minimum thickness of shell.

2. The apparatus of claim 1 wherein said programming means causes said guide means to move in the direction of mandrel advance for another part of the cycle, and to move in the opposite direction for a final part of the cycle.

3. The apparatus of claim 1 wherein said guide means is constructed and arranged to simultaneously guide a ribbon of discontinuous fibers and continuous rovings to said mandrel, and wherein said programming means causes said guide means to move in the opposite direction to mandrel advance during a first portion of each cycle and then causes said guide means to move in the same direction and at the rate of mandrel advancement during a second portion of each cycle.

4. The apparatus of claim 1 wherein said means for moving and programming said guide means comprises a cam driven by said drive means for said mandrel, a cam follower operatively connected to said guide means to drive said guide means longitudinally of the mandrel, and said cam and cam follower being shaped to cause said guide means to move in the direction of advance of said mandrel for a first portion of cam rotation, to be stationary for a second period of cam rotation, and to move said guide means in the opposite direction to mandrel advance for a third portion of cam rotation.

5. The apparatus of claim 1 wherein said means for programming said guide means comprises: a cam driven by said drive means for said mandrel; a cam follower operatively connected to said guide means to drive said guide means longitudinally of the mandrel, and said guide means being constructed and arranged to simultaneously guide a ribbon of discontinuous fibers and continuous rovings to said mandrel; said cam and cam follower being shaped to move said guide means relative to the surface of said mandrel and in the opposite direction to mandrel advance during a first portion of each rotation of the cam, and to move said guide means in the same direction and at the rate of mandrel advancement during a second portion of each rotation of said cam.

6. The apparatus of claim 5 wherein said guide means includes rib form feeding apparatus for feeding a form having a length equal to the circumference of said mandrel, and means starting said rib form feeding apparatus during said second portion of said cam rotation.

7. The apparatus of claim 1 wherein said means for moving and programming said guide means comprises a cam, a hydraulic servomotor having a control valve actuated by said cam, a first hydraulic displacement device actuated by said servomotor and a second hydraulic displacement device actuated by said first hydraulic displacement device with the ratio of the diameters of said first and second devices being such as to magnify the movement of said servomotor to cause said guide means to move in the direction of advance of said mandrel for a first portion of cam rotation, and to move said guide means in the opposite direction to mandrel advance for a second portion of cam rotation.

8. In shell forming apparatus comprising an axially extending mandrel which simultaneously advances in both rotational and axial directions at generally predetermined respective rates; feed means constructed and arranged to feed a band of predetermined width of fiber reinforcement materials to said mandrel to be wound thereon, said band being several times wider than said axial rate of advancement to produce a nominal overlap of materials on said mandrel that is a function of the band width divided by said axial rate of advance of said mandrel, support means for supporting said feed means for movement relative to said mandrel in one of said directions, and cyclic drive means which moves said feed means in said one of said directions a distance per mandrel revolution that is not greater than said predetermined rate of mandrel movement in said one of said directions for a period of time to produce a greater than nominal thickness of the reinforcement materials and then moves in the opposite direction for a period of time to produce less than said nominal thickness of the reinforcement materials, and whereby a section of shell having a thickness greater than nominal is produced while said feed means is moved in said one of said directions and a section of shell having a thickness less than nominal is produced while said feed means is moved in said other direction.

9. The apparatus of claim 8 wherein said feed means is moved in a path extending circumferentially over said mandrel.

10. In shell forming apparatus comprising an axially extending mandrel which simultaneously advances in both rotational and axial directions at generally predetermined respective rates; feed means constructed and arranged to feed a band of predetermined width of fiber reinforcement materials to said mandrel to be wound thereon, said band being several times wider than said axial rate of advancement to produce a nominal overlap of materials on said mandrel that is a function of the band width divided by said axial rate of advance of said mandrel, support means for supporting said feed means for movement axially of said mandrel, and cyclic drive means which moves said feed means a distance per mandrel revolution that is not greater than said band width for a period of time to produce a greater than nominal thickness of the reinforcement materials and then moves in the opposite direction for a period of time to produce less than said nominal thickness of the reinforcement materials, and whereby a section of shell having a thickness greater than nominal is produced while said feed means is moved in the direction of axial mandrel advance and a section of shell having a thickness less than nominal is produced while said feed means is moved in the opposite direction.

* * * * *